(12) United States Patent
Chudnovskiy et al.

(10) Patent No.: US 10,104,116 B2
(45) Date of Patent: *Oct. 16, 2018

(54) SYSTEM FOR DETECTING LINK SPAM, A METHOD, AND AN ASSOCIATED COMPUTER READABLE MEDIUM

(71) Applicant: MAJESTIC-12 LTD, Birmingham (GB)

(72) Inventors: Alexey Chudnovskiy, Birmingham (GB); Steve Pitchford, Birmingham (GB)

(73) Assignee: MAJESTIC-12 LTD, Birmingham (GB)

(*) Notice: Subject to any disclaimer, the term of this patent is extended or adjusted under 35 U.S.C. 154(b) by 0 days.

This patent is subject to a terminal disclaimer.

(21) Appl. No.: 15/019,151

(22) Filed: Feb. 9, 2016

(65) Prior Publication Data

US 2016/0156659 A1 Jun. 2, 2016

Related U.S. Application Data

(63) Continuation of application No. 13/935,011, filed on Jul. 3, 2013, now Pat. No. 9,286,402.

(51) Int. Cl.
*G06F 7/00* (2006.01)
*G06F 17/30* (2006.01)
*H04L 29/06* (2006.01)

(52) U.S. Cl.
CPC .... *H04L 63/1441* (2013.01); *G06F 17/30867* (2013.01); *H04L 63/1483* (2013.01)

(58) Field of Classification Search
CPC ............... G06F 17/30867; H04L 29/06; H04L 63/1441; H04L 63/1483
See application file for complete search history.

(56) References Cited

U.S. PATENT DOCUMENTS

| | | | |
|---|---|---|---|
| 7,854,001 B1 * | 12/2010 | Chen | H04L 12/24 726/11 |
| 8,056,132 B1 | 11/2011 | Chang et al. | |
| 8,850,570 B1 | 9/2014 | Ramzan | |
| 9,286,402 B2 * | 3/2016 | Chudnovskiy | G06F 17/30867 |
| 2005/0289148 A1 * | 12/2005 | Dorner | G06F 21/52 |
| 2010/0153544 A1 * | 6/2010 | Krassner | G06F 17/2247 709/224 |
| 2011/0314152 A1 | 12/2011 | Loder | |
| 2012/0102545 A1 | 4/2012 | Carter, III et al. | |
| 2014/0137250 A1 * | 5/2014 | Lee | H04L 63/145 726/23 |
| 2014/0310807 A1 * | 10/2014 | Qi | H04L 63/145 726/22 |
| 2015/0222649 A1 | 8/2015 | Zeng et al. | |

* cited by examiner

*Primary Examiner* — Azam Cheema
(74) *Attorney, Agent, or Firm* — Loeb & Loeb LLP (57) ABSTRACT

A system for determining whether a website is an illegitimate website, the system comprising: a requester module configured to request one or more rules from a host server for a website and to receive a response from the host server in response to a request; an analysis module configured to determine whether a response or lack of a response received by the requester module indicates that the website is an illegitimate website; and a record module configured to store an indication that the website is an illegitimate website, wherein the one or more rules provide one or more instructions to a robot computer program regarding access of the website by the robot computer program.

19 Claims, 4 Drawing Sheets

SYSTEM FOR DETECTING LINK SPAM, A METHOD, AND AN ASSOCIATED COMPUTER READABLE MEDIUM

CROSS REFERENCE TO RELATED APPLICATIONS

This application claims the benefit of, and priority to, U.S. application Ser. No. 13/935,011, filed Jul. 3, 2013, entitled "A System For Detecting Link Spam, A Method, And An Associated Computer Readable Medium," the entire content of which is incorporated herein by reference.

TECHNICAL FIELD

Embodiments of the present invention relate to a system, method and computer readable medium for determining whether a website is a legitimate website.

BACKGROUND ART

Many networks, including wide area and local area networks, include one or more servers which provide access to web pages.

The Internet, for example, is a vast wide area network including a large number of servers which host a massive number of web pages. Various different services are provided which catalogue the information which is available on these web pages. For example, a search engine service must gather information from web pages in order to respond to search requests from a user.

Web crawlers are commonly used in many different systems to gather information from web pages and to deliver this information to a cataloguing module which records information about the content of the web pages in association with one or more identifiers for the web page. The one or more identifiers may include, for example, a title, a website identifier (the web page being associated with a website), a URL (uniform resource locator).

One or more of the web pages which are accessed by the web crawler may be an illegitimate web page. An illegitimate web page may be a web page which seeks to improve its own standing, or the standing of another web page, in search results of a search engine service. In other words, the illegitimate web page may attempt to take advantage of the mechanisms used by search engine services in the ranking of web pages in sets of search results.

This is often referred to as 'link spam' and may include the use of 'link farms' in which the illegitimate web page is linked to or includes links to one or more other illegitimate or legitimate web pages with the main purpose of boosting a particular website or web page in the results produced by a search engine.

An illegitimate web page may be considered to be an illegitimate web page for other reasons too.

For example, the web page may be attempting to mimic another web page with a view to tricking a user into entering a password, a username, or the like, which the operator of the illegitimate web page will gather and then use to access the corresponding legitimate web page illicitly. This is commonly known as 'phishing'.

Other illegitimate web pages may be configured to upload one or more illicit 20 computer programs to the user's computer when the user accesses the web page using their computer.

Other illegitimate web pages may, for example, include information which is illegal or allows a user to infringe the intellectual property rights of another.

There is a desire for web crawlers to be able to identify such web pages. In the example of a search engine service, the service providers may want to avoid the listing of an illegitimate web page in the search results which are provided as a result of a user search request or may want to relegate the listing of a potentially illegitimate web page in such search results relative to the listings of other web pages.

A web crawler will typically establish a communication link with a server which hosts website; the web crawler may issue a request over the communication link which includes a request for a response file which is by convention hosted by the server with the filename "robots.txt" (each website hosted by a server may have a different such response file). This file includes information which directs the web crawler and provides the web crawler with information regarding how the web crawler should access the one or more web pages hosted by the server as part of the website. The inventors have devised methods and systems by which such a file can be used advantageously in the detection of potentially illegitimate websites.

Embodiments of the present invention seek to ameliorate one or more problems associated with the prior art.

SUMMARY OF INVENTION

Accordingly, an aspect of the present invention provides a system for determining whether a website is an illegitimate website, the system comprising: a requester module configured to request one or more rules from a host server for a website and to receive a response from the host server in response to the request; an analysis module configured to determine whether a response or lack of a response received by the requester module indicates that the website is an illegitimate website; and a record module configured to store an indication that the website is an illegitimate website, wherein the one or more rules provide one or more instructions to a robot computer program regarding access of the website by the robot computer program.

The response may include one or more returned rules.

The one or more rules may be receivable in a robot rule file.

A system may further comprise an identification module configured to identify the website.

A system may further comprise a crawler module configured to scrutinise the website to identify one or more links to one or more respective further websites.

The one or more rules may include a first set of one or more rules for a first type of robot computer program and a second set of one or more rules for a second type of robot computer program, and wherein the analysis module may be configured to identify a discrepancy between the first set and the second set of one or more rules.

The one or more rules may include a rule indicating that a robot computer program should not contact the host server for a period exceeding a threshold.

The requester module may be configured to receive a plurality of rules and the threshold is a proportion of the time period indicated by another of the rules in relation to another robot computer program.

A system may further comprise an enquiry module configured to receive an enquiry as to whether a website is a legitimate website and to return an indication regarding whether the website is indicated as legitimate in the record module.

Another aspect of the present invention provides a method of determining whether a website is an illegitimate website, the method comprising: requesting, using a requester module, one or more rules from a host server for a website; receiving a response from the host server in response to the request or noting a lack of a response; determining, at an analysis module, whether the response or lack of response indicates that the website is an illegitimate website; and storing, using a record module, an indication that the website is an illegitimate website, wherein the one or more rules provide one or more instructions to a robot computer program regarding access of the website by the robot computer program.

The response may include one or more returned rules.

The one or more rules may be received in a robot rule file.

A method may further comprise identifying the website using an identification module.

A method may further comprise scrutinising, using a crawler module, the website to identify one or more links to one or more respective further websites.

The one or more rules may include a first set of one or more rules for a first type of robot computer program and a second set of one or more rules for a second type of robot computer program, and wherein step of determining may comprise identifying a discrepancy between the first set and the second set of one or more rules.

The one or more rules may include a rule indicating that a robot computer program should not contact the host server for a period exceeding a threshold.

The receiving step may comprise receiving a plurality of rules and the threshold may be a proportion of the time period indicated by another of the rules in relation to another robot computer program.

A method may further comprise receiving, at an enquiry module, an enquiry as to whether a website is a legitimate website and to return an indication regarding whether the website is indicated as legitimate in the record module.

Another aspect of the present invention provides a computer readable medium having stored thereon instructions which, when processed by a computing device, are configured to cause the computing device to: request, using a requester module, one or more rules from a host server for a website; receive a response from the host server in response to the request or noting a lack of a response; determine, at an analysis module, whether the response or lack of response indicates that the website is an illegitimate website; and store, using a record module, an indication that the website is an illegitimate website, wherein the one or more rules provide one or more instructions to a robot computer program regarding access of the website by the robot computer program.

The response may include one or more returned rules.

The one or more rules may be received in a robot rule file.

A computer readable medium may have stored thereon instructions which, when processed by a computing device, are configured to cause the computing device to: identify the website using an identification module.

A computer readable medium may have stored thereon instructions which, when processed by a computing device, are configured to cause the computing device to: scrutinise, using a crawler module, the website to identify one or more links to one or more respective further websites.

The one or more rules may include a first set of one or more rules for a first type of robot computer program and a second set of one or more rules for a second type of robot computer program, and wherein step of determining may comprise identifying a discrepancy between the first set and the second set of one or more rules.

The one or more rules may include a rule indicating that a robot computer program should not contact the host server for a period exceeding a threshold.

The receiving step may comprise receiving a plurality of rules and the threshold is a proportion of the time period indicated by another of the rules in relation to another robot computer program.

A computer readable medium may have stored thereon instructions which, when processed by a computing device, are configured to cause the computing device to: receive, at an enquiry module, an enquiry as to whether a website is a legitimate website and to return an indication regarding whether the website is indicated as legitimate in the record module.

BRIEF DESCRIPTION OF DRAWINGS

Embodiments of the present invention are described, by way of example only, with reference to the accompanying drawings, in which.

DESCRIPTION OF EMBODIMENTS

Embodiments of the present invention are implemented, at least in part, on a server 1 (see FIGS. 1 to 4). The server 1 includes at least one processing unit 11 which is configured to receive instructions and data from one or more memory modules 12. The or each processing unit 11 is configured to process the received data in accordance with the instructions and to output processed data.

The processing unit 11 may include one or more caches 111 which are configured for the temporary storage of instructions and/or data for delivery to one or more other parts of the processing unit 11.

The instructions and data form at least part of a computer program. As will be appreciated, the server 1 is configured to perform various method steps in accordance with the computer program. The computer program may be stored on a computer readable medium 2 which is accessible by the server 1. The computer readable medium 2 may include volatile or non-volatile memory. The computer readable medium 2 may be an optical or magnetic computer readable medium 2, for example.

Accordingly, the server 1 may include a drive interface 13 which is configured to receive at least part of the computer program from a computer readable medium drive 3. The computer readable medium drive 3 is configured to receive the computer readable medium 2 and to read at least part of the computer program therefrom. In embodiments, the server 1 includes the computer readable medium drive 3. In embodiments, the computer readable medium 2 is substantially permanently received by the computer readable medium drive 3; in other embodiments, the computer readable medium drive 3 is configured to house the computer readable medium 2 removably.

The server 1 includes a network interface 14 which is configured to be communicatively coupled to a network 4 and which is communicatively coupled to one or more other components of the server 1. The network 4 may be a local area network and/or a wide area network. The network 4 may be the Internet or a part thereof. In embodiments, the network 4 is a local area network coupled to a wide area network.

Figure 2:
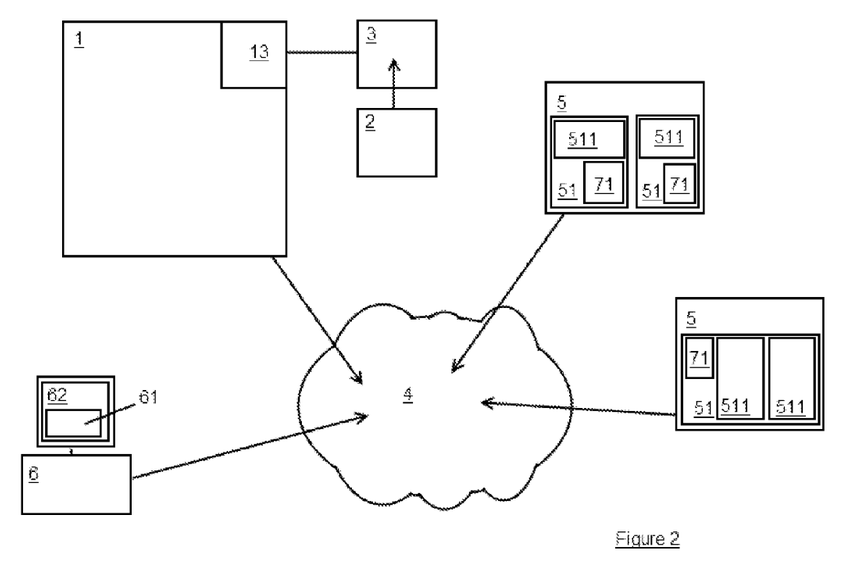
FIG. 2 shows a schematic representation of elements of embodiments of the invention.
Figure 3:
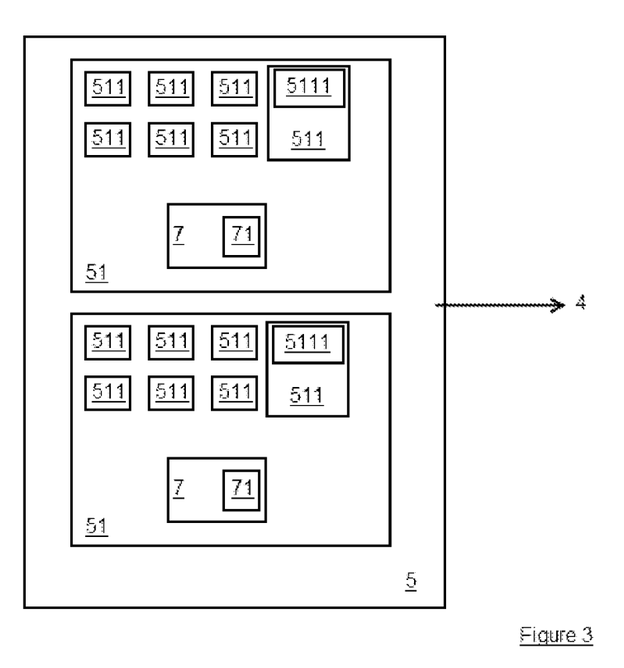
FIG. 3 shows a schematic representation of a host server.

The network 4 is also communicatively coupled to one or more other servers 5 which will be referred to herein as one or more host servers 5. The or each host server 5 hosts one or more websites 51. The or each website 51 may include one or more web pages 511. It will be appreciated that a web page 511 is one example of a resource which may be hosted by the host server 5. Other resources include pictures, other documents, dynamically created documents, programs, videos and other multimedia files, and the like. Indeed, a resource may include a part of a file—such as a header part only—or may include a header and a main part of a file. Hereinafter, embodiments of the invention are described with reference to web pages 511 but it will be understood that such embodiments also apply to other resources hosted by the host server 5.

In embodiments, a single website 51 may be hosted by a plurality of host servers 5 and a single host server 5 may host a plurality of websites 51.

The or each webpage 511 may comprise a computer file 5111 containing instructions in a hypertext mark-up language, or other language, which is configured to be processed by a browser 61 operating on a computer 6 to display the webpage 511 to a display 62 associated with the computer 6.

Accordingly, the or each host server 5 is configured to deliver the or each hosted website 51 to the computer 6 (which is communicatively coupled to the network 4) on receipt of a request from that computer 6.

The computer 6 may comprise a substantially immobile computing device (such as a desktop computer or a server), or a substantially portable computing device (such as a laptop, a notebook, a tablet, a cellular telephone, or a wearable computer).

The or each website 51 is associated with one or more rules 71. When requested by another computer program, such as a web crawler program or other robot computer program, the one or more rules 71 associated with a website 51 may be returned by the host server 5 to the requester. The requester may be a robot computer program operating on, for example, the server 1. It will be appreciated that the server 1 may, in fact, comprise a distributed processing arrangement including a plurality of computing devices which may be geographically (or otherwise) remote from each other. In such distributed processing embodiments, each computing device may operate substantially independently of the other computing devices. In other distributed processing embodiments, each computing device may operate substantially independently of one or more of the other computing devices but under the supervision of a managing or coordinating computing device which is communicatively coupled to each other computing device. In some embodiments, the aforementioned computing devices may each comprise a computer 6.

The one or more rules 71 provide information to the robot computer program which includes instructions for the robot computer program on how the operator of the website 51 wants the robot computer program to interact with the website 51. For example, the one or more rules 71 may include instructions regarding what parts of the website 51 (i.e. what files 5111 hosted by the host server 5 and associated with the website 51) may be accessed by the robot computer program. In this, and other, examples a file 5111 is associated with a website 51 if it is accessible through a common domain name. The one or more rules 71 may include an indication of how long the robot computer program should wait before contacting the host server 5 again concerning the website 51. The one or more rules 71 may include an indication that the robot computer program should not access any of the website 51.

The one or more rules 71 may be provided in accordance with a predetermined protocol such as the Robot Exclusion Standard. In such instances, the one or more rules 71 may be provided in a "robots.txt" file which is a text file stored on the host server 5 for the website 51 and associated with that website 51. The "robots.txt" file is an example of a robot rule file 7 which includes the one or more rules 71. The robot rule file 7 may, in embodiments, include a plurality of rules 71 wherein at least one rule relates to a first type of robot computer program and at least one rule relates to a second type of robot computer program (the first and second types of robot computer program being two different types of robot computer program or two of the same type of robot computer program but operated by different parties or for different purposes). Each type of robot computer program may be associated with a different type of entity, for example.

On receipt of the one or more rules 71 the requester may then attempt to access one or more files hosted by the host server 5 and forming part of the website 51. As will be appreciated this access attempt may or may not be in accordance with the one or more rules 71—for example, the one or more rules 71 may inform the requester that it is not to access a particular file or group of files but the requester may attempt to access that file or group of files. In embodiments, the host server 5 may identify the attempted breach of the one or more rules 71 and may refuse access to that file or group of files.

The one or more rules 71 are used legitimately, for example, to limit the access of certain requesters to certain parts of a website 51 hosted by a host server 5. Such limited access may be desirable in order, for example, to prevent misleading information about the content of the website 51 from being provided to robot computer programs operating for search engine services. In other instances, the operator of the website 51 merely wants to maintain a degree of privacy. In other examples, the one or more rules 71 are used legitimately to reduce the frequency of access requests made by a robot computer program to the host server 5.

The one or more websites 51 may, however, include one or more illegitimate websites 51. An illegitimate website 51 may be a website 51 which attempts to mimic a legitimate website to trick users into entering private or confidential information, a website 51 which sells illegal or potentially illegal products, a website 51 which provides access to or hosts information in breach of intellectual property laws, a website 51 which has a primary purpose of supporting the alleged legitimacy of another website (as explained in more detail below), and/or a website 51 used to promote either itself or another website 51 in search results provided by a search engine service. Of course, there are other examples of illegitimate websites 51.

The operators of an illegitimate website 51 may, therefore, seek to use the one or more rules 71 to hide or otherwise obscure the illegitimate nature of their website 51 from one or more robot computer programs.

Embodiments of the present invention seek to use the content of the one or more rules 71 to identify potentially illegitimate websites 51. Embodiments of the present invention seek to take action in response to the identification of a potentially illegitimate website 51.

Figure 1:
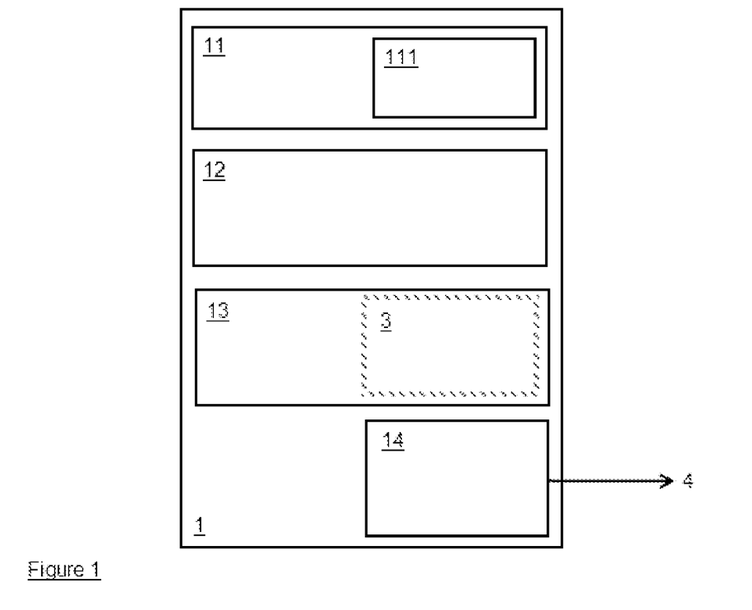
FIG. 1 shows a schematic representation of a server in accordance with an embodiment of the invention.

Accordingly, embodiments of the present invention include a computer program which may be stored on the computer readable medium 2. The computer program may be run on the server 1, instructions and data of the computer program being processed by the one or more processing units 11 of the server 1.

Figure 4:
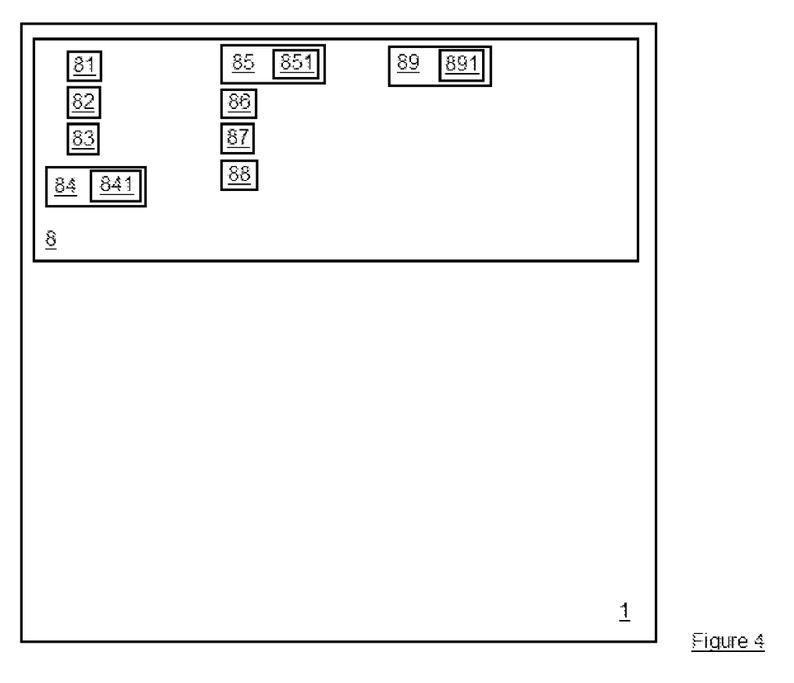
FIG. 4 shows a schematic representation of a server according to embodiments.

In embodiments, the computer program of the present invention is a robot computer program 8. A robot computer program 8 is a computer program which is configured to operate in a substantially automated manner to perform one or more tasks over the network 4. These tasks may include the accessing of one or more files 5111 (which may be web pages 511) stored on one or more host servers 5.

The robot computer program 8 comprises a plurality of modules which are configured to interact with each other. Each module of the computer program may be implemented as a set of instructions for interpretation by the one or more processing units 11 of the server 1; in embodiments, one or more of the modules comprises an element of hardware, which may be hardware which is specifically devised to allow the implementation of the relevant function. That hardware may include firmware elements which enable or implement one or more of the modules disclosed herein.

In embodiments, an identification module 81 is configured to identify a network address associated with a website 51 (the 'identified website 51') hosted by a host server 5 (the 'identified host server 5). The network address may include an IP address or a domain name (from which an IP address can be determined, for example). The identified network address may be referred to as a 'seed'. In embodiments, the identification module 81 obtains the seed through user input. In embodiments, the identification module 81 obtains the seed through a request to a record of the most popular websites 51 or through a list of the most commonly identified websites 51 in response to certain search queries input into a search engine service. As will be appreciated, such a request may be made to an external, third party, record.

A communication module 82 is configured, in embodiments, to establish a communication link with the identified host server 5 over the network 4 (through the network interface 14). This may include one or more handshaking procedures. The communication module 82 is communicatively coupled to the identification module 81 such that the communication module 82 is operable to receive the network address of the identified host server 5 (and, correspondingly, the identification module 81 is configured to send the network address to the communication module 82).

The communication module 82 uses the network address of the identified host server 5 to provide the identified host server 5 with an identifier for the server 1 (such as a network address, such as an IP address). The communication module 82 may also provide the identified host server 5 with an identifier for the robot computer program 8. In embodiments the communication module 82 may provide the identified host server 5 with a false identifier for the robot computer program 8. This false identifier may be an identifier normally associated with another type of robot computer program and/or a robot computer program provided by a different server 1. In embodiments, the false identifier is not an identifier for a robot computer program but is an identifier for a different computer program which may be a computer program provided by a different server 1. In embodiments, the false identifier is an identifier associated with another server 1.

In embodiments, the communication module 82 may route the request to the identified host server 5 through one or more proxy servers in order to obscure the identity of the server 1 from the identified host server 1. In embodiments, the communication module 82 selects one or more proxy servers through which to route the request in dependence on the false identifier. Accordingly, a proxy server may be selected whose IP address confirms (or otherwise supports) the veracity of the false identifier to the identified host server 5 in the event that the identified host server 5 attempts such a confirmation.

A requester module 83 is provided which is configured, in embodiments, to request one or more rules 71 from the identified host server 5, the one or more rules 71 being associated with the identified website 51 hosted by the identified host server 5. Accordingly, the requester module 83 may be communicatively coupled to one or both of the identification module 81 and the communication module 82 such that the requester module 83 is configured to formulate a request for one or more rules 71 for transmission to the identified host server 5 using the communication module 82.

In embodiments, it is the requester module 83 which provides the identifier of 15 the robot computer program 8 to the communication module 82 for use as described above (also as described above, the requester module 83 may provide a false identifier to the communication module 82).

The requester module 83 is further configured, in embodiments, to receive one or more rules 71 from the identified host server 5. The one or more rules 71 may, as described above, be provided in a robot rule file 7 and, as such, the requester module 83 may be configured, in embodiments, to receive a robot rule file 7 from the identified host server 5—the robot rule file 7 including one or more rules 71.

The requester module 83 may receive the one or more rules 71 through the communication module 82.

The requester module 8 may be configured to monitor the time which has elapsed since the request was issued to the identified host server 5. If the elapsed time exceeds a threshold (a 'timeout period') then the requester module 8 may issue an error signal to a record module 84. In embodiments, the requester module 8 may receive a notification from the identified host server 5 that the one or more rules 71 will not be provided, and the requester module 8 may issue an error signal to the record module 84 as a result. As will be appreciated, an illegitimate website may attempt to consume computational and network resources required for implementation of the embodiments by delaying responses to requests and the like. Timeout periods may, therefore, be set accordingly. In embodiments, the requester module 8 may receive an error or refusal message from the identified host server 5—for example, a '403 Forbidden' HTTP status code response.

The record module 84 may record the lack of a response to, or refusal of, the request (or receipt of an error or refusal message) in association with an identifier for the website 51—the identifier may include a uniform resource locator (URL) and/or an IP address and/or a domain name associated with the website 51. The record module 84 may also record other information in association with the identifier for the website 51, such as the time and/or date of the attempt.

The requester module 83 may, in embodiments, be configured to request one or more web pages 511 from the identified host server 5 in accordance with (or contrary to) the one or more rules 71. If one or more (or all) of the or each requested web pages 511 is/are then not returned (and/or an error message is returned) by the identified host server 5, then this may be recorded by the record module 84 in association with an identifier for the website 51. As will be appreciated, an illegitimate website may attempt to appear to be a legitimate website by providing one or more rules 71 on request but then not allowing access to any web page 511 of the website 51. A timeout period may be associated with requests of one or more web pages 511.

On receipt of one or more rules 71 from the identified host server 5, the requester module 83 may be configured to pass the or each rule 71 to an analysis module 85 which is configured to analyse the or each received rule 71.

The requester module 83 may, in embodiments, be configured to make one or more additional requests to the same identified host server 5 for one or more rules 71 associated with the identified website 51 hosted by the identified host server 5. The or each additional request may be, for example, associated with a different robot computer program 8 identifier or false robot computer program identifier. As with the first request, the or each subsequent request may be performed in substantially the same manner such that one or more rules 71 received in response to the or each further request are passed to the analysis module 85.

The requester module 83 may be further configured to send to the analysis module 85 an identifier for the website 51—the identifier may include a uniform resource locator (URL) and/or an IP address and/or a domain name associated with the website 51. In addition, the requester module 83 may be configured to send to the analysis module an indication of the robot computer program identifier which was sent to the identified host server 5 as part of the request which resulted in the issuance of the one or more rules 71.

The analysis module 85 is configured to analyse the one or more rules 71 associated with the identified website 51 and to determine if the identified website 51 is likely to be an illegitimate website. As will be understood from the description above, the analysis module 85 may, in fact, be implemented in a distributed computing arrangement with a plurality of analysis modules 85 (each of which may be substantially independent or which may be interdependent) which each perform all of part of the processes described herein. Each analysis module may be coupled to its own record module 84 and a central record module may be provided to store the collective contents of a plurality of record modules 84 in a distributed processing arrangement.

The analysis module 85 may apply a number of different methods in order to determine if the identified website 51 is likely to be an illegitimate website.

The methods may include the comparison of the one or more rules 71 for one type of robot computer program with the one or more rules 71 for another type of robot computer program. The rules 71 (for both types of robot computer program) may, in this instance, be provided by the host server 5 as part of the same robot rule file 7. A discrepancy between the one or more rules 71 for one type of robot computer program compared to another may be an indication that the operator of the identified website 51 is attempting to obscure the content of at least part of their website 51 from certain types of robot computer program. For example, the operator of the identified website 51 may want the content of the website 51 to be visible to robot computer programs originating from a search engine service so that the website appears more prominently in search results produced by the search engine service. However, the operator of the identified website 51 may want to limit access to services which are intended to identify illegitimate websites. The provision of one or more different rules to one type of robot computer program (such as a robot operated by a search engine service) compared to another type of robot computer program may indicated an illegitimate website 51. A type of robot computer program may be a robot computer program associated with a search engine and another type of robot computer program may be a robot computer program associated with an illegitimate website analysis system.

The methods may include the comparison of the one or more rules 71 received from the identified host server 5 (and associated with the identified website 51) in response to a first request with the one or more rules 71 received from the same identified host server 5 (and associated with the same identified website 51) in response to a second request—the first and second requests having been made in association with two different robot computer program identifiers. A discrepancy between the two sets of one or more rules (one set having been received in response to the first request and the other set having been received in response to the second request) may indicate that the operator of the identified website 51 is attempting to obscure some aspect of its operation from certain robot computer programs. This may be an indication that the website 51 is an illegitimate website. Thus, the operator of the identified website 51 may be attempting to mislead a robot computer program 8 by presenting a plurality of rules in response to a request from that robot computer program 8 which imply that the operator of the website 51 is not attempting to present a different impression of the website 51 to that robot computer program 8 compared to another. For example, in response to a request from the robot computer program 8 of embodiments of the invention, one or more rules 71 may be returned which indicate that the robot computer program 8 is given similar or identical access as a robot of a search engine service. However, in response to a request from a robot of a search engine service, one or more rules 71 may be provided which allow far greater access to the website 51.

Discrepancies between one or more rules may be with regard to the parts of the website 51 which the robot computer programs are permitted to access, or may be with regard to the frequency at which the robot computer program is allowed to contact the website 51.

Obtaining one or more rules 71 which were returned to one type of robot computer program and one or more rules 71 which were returned to another type of robot computer program by the identified host server 5 may be achieved by the robot computer program 8 of embodiments of the invention through the use of one or more false identifiers—as discussed above. In addition, or alternatively, the analysis module 85 may be provided with one or more rules which were returned by the identified host server 5 to another robot computer program (e.g. a robot used by a search engine service).

As will be appreciated, the analysis module 85 may be configured to cause the storage of the one or more rules received by the robot computer program 8 of embodiments and/or the one or more rules received by another robot computer program in order to allow this analysis to be performed at a later time (when there is, for example, sufficient information available to make a comparison between two sets of one or more rules received in association with the same identified website 51). The one or more rules may, therefore, be stored by the record module 84 in the database 841 in association with an identifier for the website 51—there may be a communicative coupling between the record module 84 and the analysis module 85 for this purpose.

The methods may include the one or more rules received from the identified host server 5 including an indication that the robot computer program 8 should not contact the identified host server 5 in relation to the identified website 51 for a period exceeding a predetermined threshold. The threshold may be a proportion of the period specified in the one or more rules 71 for a different robot computer program or different type of robot computer program.

The methods may include the one or more rules received from the identified host server 5 including an indication that the robot computer program 8 should not access any of web pages 511 of the website 51.

The methods may include the identification of a transmission or processing delay associated with a web page 511 which the one or more rules 71 indicate can be accessed by the robot computer program 8. This delay may be the result of, for example, the operation of a script of the web page 511. Such a delay may be implemented by an illegitimate website 51, for example, to consume network and/or computational resources associated with the robot computer program 8—to frustrate the operation thereof.

As will be understood from the above discussion, the analysis module 85 may also be configured to use one or more web pages 511 and the one or more rules 71 to identify illegitimate websites 51. For example, the refusal of an identified host server 5 to provide a web page 511 (requested by the robot computer program 8 in accordance with or contrary to the or each rule 71) may indicate that the website 51 is an illegitimate website. The refusal to provide 10 any rules 71 or an excessive delay (as mentioned above) in response to any request may also be viewed by the analysis module 85 as a potential indicator of an illegitimate website.

A delay or refusal may be determined by a lack of a response within a predetermined period.

Instead of comparing the one or more rules 71, embodiments of the analysis module 85 may compare a hash values representative of the one or more rules 71. Other methods may be used, for example, the comparison of codes representative of the one or more rules 71, parts of the or each rule 71, abbreviated forms of the or each rule 71, and/or codes representative of the function of the or each rule 71.

As will be appreciated, in embodiments, the analysis module 85 requires information which allows it to determine a type of a particular robot computer program—e.g. a robot computer program of a search engine compared to a robot computer program operated by a service which seeks to identify illegitimate websites 51. According, the analysis module 85 may be communicatively coupled to a robot database 87. The robot database 87 may store one or more robot computer program identifiers, the or each identifier being associated with a robot computer program. The robot database 87 may also store other information about the or each robot computer program for which an identifier is stored: such as an indication of a type of robot (e.g. a search engine service robot, a link intelligence robot, etc), a version of the robot, and/or one or more other names or identifiers for the robot. The analysis module 85 may be configured to access information from the robot database 87 in order to identify the type of a given robot computer program.

The robot database 87 may also be communicatively coupled to the requester module 83 and/or the communication module 82 such that these modules 82,83 can use false identifiers as discussed above.

In embodiments, the robot database 87 also stores, in association with the or each list robot computer program identifier, a record of the one or more rules 71 received by that robot computer program from one or more host servers 5 in association with one or more websites 51. This, as will be appreciated, may be instead of or in addition to the similar record held by the record module 84 in the database 841 (see the above discussion). The database 841 may be located on a remote computing device, a separate server, and/or a plurality of distributed processing devices in a distributed processing arrangement.

The analysis module 85 is communicatively coupled to the record module 84 and is configured to store the results of its analysis in the record module 84 in association with an identifier for the identified website—the identifier may include a uniform resource locator (URL) and/or an IP address and/or a domain name associated with the website 51. Accordingly, if the analysis module 85 determines that the identified website 51 may be an illegitimate website, then this may be recorded by the record module 84 which is, in turn, configured to record the results of this analysis. If, on the other hand, the analysis module 85 determines the that identified website 51 is unlikely to be an illegitimate website, then this may also be recorded by the record module 84 which is, in turn, configured to record the results of this analysis.

The record module 84 may store information in a database 841. The database 841 may be stored in volatile or non-volatile memory associated with the server 1.

The robot computer program 8 may further include, in embodiments, an enquiry module 86. The enquiry module 86 is configured to receive an enquiry (which may be a third party enquiry) regarding a website 51 and/or host server 5. The enquiry may be issued by, for example, a search engine service communicatively coupled to the server 1 (e.g. through the network 4). The enquiry may include an identifier for a website 51 and/or a host server 5. The enquiry module 86 may be configured to use the received identifier for the website 51 and/or host server 5 to locate a relevant record for that website 51 and/or host server 5 within the database 841 of the record module 84. The enquiry module 86 may, as will be appreciated, be communicatively coupled to the record module 84 for this purpose. The record module 84 may, of course, be configured to receive an enquiry from the enquiry module 86 and to return information from the database 841 of the record module 84 is response to the enquiry. The information may include a determination regarding whether or not the website 51 is considered to be likely to be an illegitimate website 51 and/or whether or not the host server 5 is known to host illegitimate websites 51.

The party making the enquiry may then use the returned information in the provision of one or more services. For example, if the enquiry was from a search engine service, the search engine service be relegate search results associated with an illegitimate website 51 or probable illegitimate website 51.

In other embodiments, the operator of a host server 5 may make such an enquiry regarding a website 51 which it is hosting. The operator of the host server 5 may withdraw services from the operators of the website 51 if it is or if it is likely to be an illegitimate website 51.

In other embodiments, a law enforcement agency may make such an enquiry.

In embodiments, the robot computer program 8 includes a crawler module 88. The crawler module 88 is communicatively coupled to the communication module 82 and is configured to issue one or more requests for web pages 511 of the identified website 51. The communication module 82 is further configured, in such embodiments, to send one or more corresponding requests to the identified host server 5 of the identified website 51. The communication module 82 is further configured, in such embodiments, to receive one or more web pages 511 from the identified server 5 in response. The communication module 82 may pass the or each web page 511 to the crawler module 88 which may then scrutinise the web page 511. This scrutiny may, for example, result in the identification of one or more links to one or more other web pages 511 of the identified website 51 or one or more web pages of another website 51. The crawler module 88 may proceed to request, via the communication module 82, the one or more web pages 511 to which links were provided, and so on. The crawler module 88 may pass details of any other websites 51 to the identification module 81 so that any other websites 51 can become the identified website 51 in accordance with the above description.

The crawler module 88 may also gather other information from the or each web page 511. This other information may include names, addresses, email addresses, content information (e.g. an indicator of the topic of text on the web page 511), potential breaches of intellectual property laws, and the like. This other information may be stored in association with an identifier for the website 51 and/or web page 511 by, for example, the record module 84 in the database 841 (the record module 84 may be communicatively coupled to the crawler module 88).

The crawler module 88 may be communicatively coupled to a mapping module 89 which is configured to generate a map 891 of the web pages and websites which have been so scrutinised.

As will be appreciated, therefore, given a seed, the crawler module 88 may identify further websites which are passed to the identification module 81, such 10 that those further websites are analysed by the robot computer program 8—which may result in yet further websites being identified, and so on.

The crawler module 88 may or may not obey any of the one or more rules 71 regarding which parts of an identified website 51 can be accessed by the robot computer program 8.

The map 891 generated by the mapping module 89 may be subdivided by website.

An illegitimate website may attempt to appear to be a legitimate website to known robot computer programs through the support of one or more other illegitimate websites. For example, an illegitimate website which is not linked to by any or many other websites may be detected as illegitimate by existing robots. Accordingly, an operator of an illegitimate website may operate a plurality of interlinked illegitimate websites which seek to make one or more of those websites appear to be legitimate by virtue of the links therebetween. The links may be biased towards a primary illegitimate website of the group of interlinked websites. As will be appreciated, such networks of interlinked websites may constitute a 'link farm' for the purpose of improving the standing of a website in the result of a search engine which uses analysis of links to order search results (often known as 'link juice'). Such link farms may include illegitimate, legitimate, and semi-legitimate websites, for example.

The map 891 generated by the mapping module 89 may allow such interlinked websites to be identified.

In embodiments, the analysis module 85 is further configured to access the map 891 generated by the mapping module 89. As such the analysis module 85 may be communicatively coupled to the mapping module 89. the analysis module 85 may analyse one or more rules which are provided to a robot of first type (e.g. of the type used by a service which detects illegitimate websites) and one or more rules which are provided to a robot of a second type (e.g. of the type used by a search engine service) to identify families of interlinked websites to which access is permitted to robots of the second type but prohibited to robots of the first type in accordance with one or more of the rules 71 associated therewith. This form of selectivity may be construed by the analysis module 85 as an indicator that one or more of the family of interlinked websites is illegitimate.

The analysis module 85 may, in embodiments, be configured to analyse the one or more rules 71 and/or the robot rule file 7 by comparison to one or more entries in a database of rule profiles 851. The database of rule profiles 851 includes information regarding one or more rules 71 which are thought to be related to an illegitimate website 51. Accordingly, if an operator of a suspected illegitimate website 51 copies one or more rules (or part of a robot rule file 7) from another illegitimate website, then the analysis module 85 may identify the similarity or identity between the one or more rules (or part of the robot rule file 7) and determine that the suspected illegitimate website 51 is likely to be an illegitimate website 51. The database of rule profiles 851 may be provided separately or may be automatically generated by the robot computer program 7 on determination that an identified website 51 is likely to be illegitimate (one or more parts of the one or more rules 71 or robot rule file 7 associated therewith being copied to the database of rule profiles 851). The database of rule profiles 851 may store and compare hash values of one or more rules 71 (or parts of robot rule files 7) rather than the one or more rules 71 (or parts of robot rule files 7) themselves.

In the above description, various modules have been described as being part of the robot computer program 8. In such embodiments, it will be appreciated that the robot computer program 8 may comprise a suite of interacting computer programs wherein each computer program includes one or more of the aforementioned modules.

In particular, in embodiments, a first computer program—the 'robot' part of the suite—may include the identification module 81, the communication module 82, the requester module 83, and all or part of the record module 84. In embodiments, the first computer program does not include the record module 84.

In embodiments, a second computer program—the 'analysis' part of the suite—may include the analysis module 85 and may also include the record module 84 (or a part thereof or a central record module as described herein). In embodiments, there is a plurality of analysis modules 85 is a distributed processing arrangement and in embodiments, there is an analysis module 85 for each first computer program.

In embodiments, a third computer program—the 'enquiry' part of the suite—may include the enquiry module 86 and may include the mapping module 89. In embodiments, the mapping module 89 is part of a fourth computer program of the suite—the 'mapping' part of the suite.

The crawler module 88 may be a part of any of the aforementioned first, second, third, or fourth computer programs.

The robot database 87 may be a central robot database or may be a distributed database or there may be multiple robot databases. In embodiments, each analysis module 85 has its own robot database 87. In embodiments, the or each first computer program includes a robot database 87.

As will be understood, embodiments of the present invention include methods of operating one or more computing devices (such as a server 1) in accordance with the robot computer program 8 (or parts thereof) discussed above.

Individual modules as described herein may be combined in any suitable manner into one or more combined modules.

All or some of the functions of one module may be integrated with the functions of another module or other modules.

The or each module may be implemented as a set of instructions for interpretation by a computing device such as a server 1. The set of instructions may be stored on a computer readable medium 2.

One or more of the modules described herein may, as will be appreciated, implemented on a server 1 (or other computing device) to form a system in accordance with embodiments of the present invention.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A computing system comprising a processor and a memory for determining whether a website is an illegitimate website, the system comprising:
    a requester module executed by the processor configured to request one or more rules from a host server for a website and to receive a response from the host server in response to the request, the response including one or more rules;
    an analysis module executed by the processor configured to determine whether a response or lack of a response received by the requester module, from the host server in response to a request for one or more rules from the host server, indicates that the website is an illegitimate website; and
    a record module executed by the processor configured to store an indication that the website is an illegitimate website, wherein the one or more rules provide one or more instructions to a robot computer program regarding access of the website by the robot computer program, wherein the one or more rules include a first set of one or more rules for a first type of robot computer program and a second set of one or more rules for a second type of robot computer program, and wherein the analysis module is configured to identify a discrepancy between the first set and the second set of one or more rules.

2. The computing system according to claim 1, wherein the response includes one or more returned rules.

3. The computing system according to claim 2, wherein the one or more rules are receivable in a robot rule file.

4. The computing system according to claim 1, further comprising an identification module configured to identify the website.

5. The computing system according to claim 1, further comprising a crawler module configured to scrutinize the website to identify one or more links to one or more respective further websites.

6. The computing system according to claim 1, further comprising an enquiry module configured to receive an enquiry as to whether a website is a legitimate website and to return an indication regarding whether the website is indicated as legitimate in the record module.

7. A method of determining whether a website is an illegitimate website, the method comprising:
    requesting, using a requester module, one or more rules from a host server for a website;
    receiving a response from the host server in response to the request for one or more rules from the host server or noting a lack of a response to the request for one or more rules from the host server;
    determining, at an analysis module, whether the response or lack of response indicates that the website is an illegitimate website; and
    storing, using a record module, an indication that the website is an illegitimate website when the received response or lack of response indicates that the website is an illegitimate website, wherein the one or more rules provide one or more instructions to a robot computer program regarding access of the website by the robot computer program, wherein the one or more rules include a first set of one or more rules for a first type of robot computer program and a second set of one or more rules for a second type of robot computer program, and wherein step of determining comprises identifying a discrepancy between the first set and the second set of one or more rules.

8. The method according to claim 7, wherein the response includes one or more returned rules.

9. The method according to claim 8, wherein the one or more rules are received in a robot rule file.

10. The method according to claim 7, further comprising identifying the website using an identification module.

11. The method according to claim 7, further comprising scrutinizing, using a crawler module, the website to identify one or more links to one or more respective further websites.

12. The method according to claim 7, further comprising receiving, at an enquiry module, an enquiry as to whether a website is a legitimate website and to return an indication regarding whether the website is indicated as legitimate in the record module.

13. A non-transitory computer readable medium having stored thereon instructions which, when processed by a computing device, are configured to cause the computing device to:
    request, using a requester module, one or more rules from a host server for a website;
    receive a response from the host server in response to the request or noting a lack of a response to the request for one or more rules from the host server;
    determine, at an analysis module, whether the response or lack of response indicates that the website is an illegitimate website; and
    store, using a record module, an indication that the website is an illegitimate website when the received response or lack of response indicates that the website is an illegitimate website, wherein the one or more rules provide one or more instructions to a robot computer program regarding access of the website by the robot computer program, wherein the one or more rules include a first set of one or more rules for a first type of robot computer program and a second set of one or more rules for a second type of robot computer program, and wherein step of determining comprises identifying a discrepancy between the first set and the second set of one or more rules.

14. The computer readable medium according to claim 13, wherein the response includes one or more returned rules.

15. The computer readable medium according to claim 14, wherein the one or more rules are received in a robot rule file.

16. The computer readable medium according to claim 13, having stored thereon instructions which, when processed by a computing device, are configured to cause the computing device to:

identify the website using an identification module.

17. The computer readable medium according to claim 13, having stored thereon instructions which, when processed by a computing device, are configured to cause the computing device to:

scrutinize, using a crawler module, the website to identify one or more links to one or more respective further websites.

18. The computer readable medium according to claim 13, having stored thereon instructions which, when processed by a computing device, are configured to cause the computing device to:

receive, at an enquiry module, an enquiry as to whether a website is a legitimate website and to return an indication regarding whether the website is indicated as legitimate in the record module.

19. A non-transitory computer readable medium having stored thereon instructions which, when processed by a computing device, are configured to cause the computing device to:

request, using a requester module, one or more rules from a host server for a website;

receive a response from the host server in response to the request or noting a lack of a response;

determine, at an analysis module, whether the response or lack of response indicates that the website is an illegitimate website; and store, using a record module, an indication that the website is an illegitimate website when the received response or lack of response indicates that the website is an illegitimate website, wherein the one or more rules provide one or more instructions to a robot computer program regarding access of the website by the robot computer program, wherein the one or more rules include a first set of one or more rules for a first type of robot computer program and a second set of one or more rules for a second type of robot computer program, and wherein step of determining comprises identifying a discrepancy between the first set and the second set of one or more rules.

* * * * *